(12) United States Patent
Andersson et al.

(10) Patent No.: US 12,508,708 B2
(45) Date of Patent: *Dec. 30, 2025

(54) METHOD OF HANDLING MANIPULATOR, CONTROL SYSTEM AND INDUSTRIAL ROBOT

(71) Applicant: ABB Schweiz AG, Baden (CH)

(72) Inventors: Hans Andersson, Västerås (SE); Markus Enberg, Västerås (SE); Sven Hanssen, Västerås (SE)

(73) Assignee: ABB Schweiz AG, Baden (CH)

( * ) Notice: Subject to any disclaimer, the term of this patent is extended or adjusted under 35 U.S.C. 154(b) by 149 days.

This patent is subject to a terminal disclaimer.

(21) Appl. No.: 18/549,021

(22) PCT Filed: Mar. 11, 2021

(86) PCT No.: PCT/EP2021/056137
§ 371 (c)(1),
(2) Date: Sep. 5, 2023

(87) PCT Pub. No.: WO2022/188976
PCT Pub. Date: Sep. 15, 2022

(65) Prior Publication Data
US 2024/0149450 A1 May 9, 2024

(51) Int. Cl.
*B25J 9/16* (2006.01)
*B25J 11/00* (2006.01)

(52) U.S. Cl.
CPC .......... *B25J 9/1664* (2013.01); *B25J 11/005* (2013.01); *G05B 2219/39364* (2013.01); *G05B 2219/40521* (2013.01)

(58) Field of Classification Search
CPC .............. B25J 9/1664; B25J 11/005; G05B 2219/39364; G05B 2219/40521
See application file for complete search history.

(56) References Cited

U.S. PATENT DOCUMENTS 6,343,243 B1   1/2002  Brogårdh et al.
9,258,550 B1 * 2/2016  Sieracki ................. G06V 20/63
(Continued)

FOREIGN PATENT DOCUMENTS

CN   109072586 A   12/2018
CN   109514602 A    3/2019
(Continued)

OTHER PUBLICATIONS

International Search Report and Written Opinion of the International Searching Authority; Application No. PCT/EP2021/056137; Completed: Nov. 29, 2021; Mailing Date: Dec. 8, 2021; 17 Pages.
(Continued)

*Primary Examiner* — Sohana Tanju Khayer
(74) *Attorney, Agent, or Firm* — Whitmyer IP Group LLC

(57) ABSTRACT

A method of handling a manipulator of an industrial robot, the manipulator including a base member, a mounting interface and a kinematic chain between the base member and the mounting interface, the kinematic chain including the base member, the mounting interface and at least one controllable joint, the method including providing a candidate trajectory for the manipulator, the candidate trajectory being associated with a candidate path; receiving a load location input from a user, the load location input being associated with a load location associated with the industrial robot outside the kinematic chain; and calculating load values of a load parameter that will affect the load location if the candidate trajectory is executed. A control system and an industrial robot are also provided.

20 Claims, 14 Drawing Sheets

(56) References Cited

U.S. PATENT DOCUMENTS

| | | | |
|---|---|---|---|
| 9,393,693 B1* | 7/2016 | Kalakrishnan | B25J 9/1633 |
| 9,910,761 B1* | 3/2018 | Jules | G06F 9/451 |
| 9,981,382 B1* | 5/2018 | Strauss | B25J 9/1697 |
| 11,970,164 B1* | 4/2024 | Havlak | B60W 60/00272 |
| 11,993,257 B2* | 5/2024 | Keller | B60W 30/0956 |
| 12,214,500 B2* | 2/2025 | Pivac | B25J 9/1664 |
| 2016/0016311 A1* | 1/2016 | Konolige | B25J 9/1664 |
| | | | 901/30 |
| 2019/0016543 A1* | 1/2019 | Turpin | B65G 59/02 |
| 2019/0160678 A1* | 5/2019 | Zhang | B25J 9/163 |
| 2019/0255705 A1 | 8/2019 | Shirahori et al. | |
| 2019/0291275 A1* | 9/2019 | Szarski | B25J 9/1671 |
| 2020/0030995 A1* | 1/2020 | Lu | B65G 1/0435 |
| 2020/0061820 A1 | 2/2020 | Mcdaniel | |
| 2020/0281676 A1 | 9/2020 | Rohs et al. | |
| 2020/0282562 A1* | 9/2020 | Okamoto | B25J 9/163 |
| 2020/0316782 A1* | 10/2020 | Chavez | G06T 7/13 |
| 2020/0384647 A1* | 12/2020 | Hatanaka | B25J 9/1697 |
| 2021/0031769 A1* | 2/2021 | Matsumoto | G05D 1/695 |
| 2021/0046655 A1* | 2/2021 | Deyle | B25J 9/1664 |
| 2021/0146532 A1* | 5/2021 | Rodriguez Garcia | |
| | | | B25J 9/0087 |
| 2021/0241174 A1* | 8/2021 | Schiegg | G06N 3/044 |
| 2021/0318462 A1* | 10/2021 | Servais | G01V 3/18 |
| 2021/0382491 A1* | 12/2021 | Murotani | G05D 1/0061 |
| 2022/0134565 A1* | 5/2022 | Takeuchi | B25J 9/1669 |
| | | | 700/245 |
| 2022/0193908 A1* | 6/2022 | Kroeger | B25J 9/1676 |
| 2022/0266447 A1* | 8/2022 | Spenninger | B25J 9/1638 |
| 2022/0349996 A1* | 11/2022 | Fina | G01C 21/3844 |

FOREIGN PATENT DOCUMENTS

| | | |
|---|---|---|
| CN | 111037567 A | 4/2020 |
| JP | 2006187826 A | 7/2006 |
| WO | 2006117022 A1 | 11/2006 |

OTHER PUBLICATIONS

International Preliminary Report on Patentabilty; Application No. PCT/EP2021/056137; Issued: Sep. 12, 2023; 11 Pages.

Chinese Office Action; Application No. 2021800949895; Completed: Jul. 21, 2025; Issued: Jul. 22, 2025; 22 Pages.

* cited by examiner

METHOD OF HANDLING MANIPULATOR, CONTROL SYSTEM AND INDUSTRIAL ROBOT

TECHNICAL FIELD

The present disclosure generally relates to a robotic manipulator. In particular, a method of handling a manipulator of an industrial robot, a control system for handling a manipulator of an industrial robot, and an industrial robot comprising a manipulator and a control system, are provided.

BACKGROUND

Robotic manipulators often have a tool or other end effector connected to a tool flange thereof. A tool center point (TCP) may then be defined for the end effector. The manipulator may then be controlled to move along a path such that the TCP follows the path. A further example of an end effector is a sensor mounted to the tool flange. A robotic manipulator may also be provided with attachments other than an end effector, such as a paint device or a welding device fixed to an intermediate link of the manipulator.

In order to design an attachment for a robotic manipulator, a wide range of design choices are available, for example regarding the structural integrity of the attachment. Also the structural and dynamic properties of the manipulator need to be considered for the design of the attachment. Today, attachments are usually dimensioned based on the experience of a mechanical engineer who estimates forces and torques acting on the attachment. With this type of dimensioning, it is very difficult to provide an optimal design of the attachment. The loads on the attachment, such as forces and torques, are either underestimated or overestimated. In case of underestimated loads, the attachment is too weak and risks to fail in service. In case of overestimated loads, the attachment is heavier than necessary which may require a rating of the manipulator to be increased, an acceleration of the manipulator to be reduced, and/or may result in a reduced lifetime of actuators of the manipulator.

In some implementations, the manipulator may carry an attachment that is sensible to loads. In prior art solutions, the speed and/or acceleration of the manipulator is restricted globally to reduce the loads on the sensitive attachment carried by the manipulator. This is an iterative approach that is difficult to program. Moreover, there is a risk that the speed and/or acceleration is limited too much to thereby unnecessarily reduce the performance of the manipulator. There is also a risk that the loads are still too high due to the kinematic and dynamic complexity of the manipulator, potentially causing failure of the attachment. Introduction of a limitation of acceleration based on a particular attachment is also not an optimal solution since the attachment can be subjected to high loads with low accelerations (risking failure) and can be subjected to low loads with high acceleration (bad performance utilization).

U.S. Pat. No. 9,393,693 B1 discloses a method for determining and modeling admissible gripper forces. The method comprises receiving data representative of a plurality of trajectories along which a robotic manipulator, while gripping one or more physical objects, previously moved the one or more objects without dropping the one or more objects. The method further comprises determining set of force vectors corresponding to the trajectories. The method further comprises determining a three-dimensional virtual model of the set, where boundaries of the model represent constraints on magnitudes of forces that are applied in a given direction to perform the trajectories. The method further comprises determining one or more subsequent trajectories that correspond to a subsequent set of force vectors that are within the boundaries of the model and along which the robotic manipulator can move a subsequent physical object at particular accelerations without dropping the subsequent object.

SUMMARY

One object of the present disclosure is to provide a method of handling a manipulator of an industrial robot, which method efficiently assists in a structural design of one or more parts associated with the industrial robot.

A further object of the present disclosure is to provide a method of handling a manipulator of an industrial robot, which method enables a structural design of one or more parts of the industrial robot to be optimized and/or more efficiently utilized.

A still further object of the present disclosure is to provide a method of handling a manipulator of an industrial robot, which method efficiently assists in trajectory planning of the manipulator.

A still further object of the present disclosure is to provide a method of handling a manipulator of an industrial robot, which method enables loads outside a kinematic chain of the manipulator to be accurately controlled.

A still further object of the present disclosure is to provide a method of handling a manipulator of an industrial robot, which method improves user experience.

A still further object of the present disclosure is to provide a method of handling a manipulator of an industrial robot, which method solves several or all of the foregoing objects in combination.

A still further object of the present disclosure is to provide a control system for handling a manipulator of an industrial robot, which control system solves one, several or all of the foregoing objects.

A still further object of the present disclosure is to provide an industrial robot comprising a manipulator and a control system, which industrial robot solves one, several or all of the foregoing objects.

According to a first aspect, there is provided a method of handling a manipulator of an industrial robot, the manipulator comprising a base member, a mounting interface and a kinematic chain between the base member and the mounting interface, the kinematic chain comprising the base member, the mounting interface and at least one controllable joint, the method comprising providing a candidate trajectory for the manipulator, the candidate trajectory being associated with a candidate path; receiving a load location input from a user, the load location input being associated with a load location associated with the industrial robot outside the kinematic chain; and calculating load values of a load parameter that will affect the load location if the candidate trajectory is executed.

By means of the load values for a selected load location outside the kinematic chain, the method provides a versatile and efficient way to evaluate the load values for the candidate trajectory. For example, the method greatly improves a design process of tools for the manipulator, making it possible to design lighter tools. A selection of a lighter tool for the manipulator in turn impacts a maximum acceleration and/or a choice of manipulator. The method enables a faster and more efficient tool design by virtually testing one or more tool designs for one or more candidate trajectories and iterating the tool designs and/or the candidate trajectories for an optimized design.

The manipulator may comprise at least two links and one controllable joint between each pair of adjacent links. In case the manipulator is a serial manipulator, the manipulator comprises only one kinematic chain. In case the manipulator is a parallel manipulator, the manipulator comprises at least two kinematic chains. The method may employ a control system of any type according to the second aspect and/or an industrial robot of any type according to the third aspect.

The load location may be in an attachment connected to the manipulator. One example of such attachment is an end effector. Also a payload carried by the end effector can be considered to constitute an attachment connected to the manipulator. The end effector and the payload may be said to be connected distally of the kinematic chain and in series with the kinematic chain. A further example of such attachment is an external device connected to an intermediate link of the manipulator, such as a painting device or a welding device connected to the arm of the manipulator. The external device may be said to be connected in parallel with the kinematic chain.

A further example of a load location outside the kinematic chain of the manipulator is an external structure, such as a floor, a foundation or a pedestal, to which the base member is connected. The external structure may also be one or more fasteners, such as screws, by means of which the base member is secured. Such external structure may be said to be connected proximally of the kinematic chain and in series with the kinematic chain. The load locations outside the kinematic chain may thus be various interfaces to the manipulator. The load locations may be directly or indirectly fixed to a part of the manipulator, such as a link, the base member or the mounting interface.

The base member may be fixed to the external structure. The external structure may however be a movable structure, such as a conveyor. The manipulator may comprise a first link movable relative to the base member at a first joint.

The mounting interface may be connected to a most distal link of the manipulator. The mounting interface provides an interface for connection of a tool, or other end effector. The mounting interface may be a tool flange.

The candidate trajectory may be provided by the user and/or by a control system of the industrial robot. The candidate trajectory may for example be provided by means of lead through programming. According to a further example, the candidate trajectory can be automatically generated by the control system, for example based on one or more tasks. The method may further comprise executing the candidate trajectory by the manipulator after calculating the load values. The method may however comprise calculating the load values without executing the candidate trajectory.

In addition to the candidate path, the candidate trajectory may comprise a speed profile and an acceleration profile along the candidate path. The speed profile and the acceleration profile may be referred to as a candidate speed and a candidate acceleration, respectively. Also a type of end effector may be considered to belong to the candidate trajectory. Thus, a first trajectory may differ from a second trajectory only in that the trajectories are planned for execution with different types of end effectors.

The load location input may be associated with one or more load locations associated with the industrial robot outside the kinematic chain. The load location input may for example be provided via a user interface, such as a programming device.

The load location may for example be a single point, a cross-section or a region selected by the user. The load location is a location of interest outside the kinematic chain where the load values will be calculated for the candidate trajectory.

The load values may be calculated by means of a control system according to the present disclosure. Examples of load parameters include forces, torques, accelerations and stresses.

The calculation of the load values may comprise simulating the candidate trajectory to determine the load values. The method may further comprise communicating the load values to a user, for example by means of a display.

The method may further comprise providing one or more load location parameters associated with the load location, wherein the calculation of the load values is based on the one or more load location parameters. The load location parameters may comprise one or more static values characterizing the load location. Examples of load location parameters associated with the load location include mass, inertia, center of gravity, stiffness and/or compliance.

The method may thus further comprise providing a model of the attachment, the external device or the external structure. This model may in turn comprise the one or more load location parameters associated with the load location. The model may for example be a solid or a mesh of finite elements in order to increase accuracy of the calculation of the load values. In case of finite elements, one or more load location parameters may be defined for each finite element.

The one or more load location parameters may be calculated, may be empirically determined and/or may provided by the user. The one or more load location parameters may for example be empirically determined by means of force sensors and/or gyros.

The method may further comprise providing a manipulator model of the manipulator. The manipulator model may describe static and dynamic properties of the industrial robot. The manipulator model may comprise one or more position dependent terms, one or more speed dependent terms and one or more acceleration dependent terms. For example, gravity forces and centripetal forces can be considered for the candidate trajectory when calculating the load values based on the manipulator model.

The method may further comprise communicating load value information associated with the load values to the user. The communication of load value information may comprise displaying the load value information. In this case, the display of load value information may comprise displaying the load values and/or visualizing indications of the load values. A visualization of indications of the load values comprise more than a mere display of numbers. The visualization may for example comprise color coding or patterns indicating magnitudes of the load values.

The method may further comprise visualizing the candidate path associated with the candidate trajectory. In this case, the load value information may be displayed in association with the candidate path.

Alternatively, or in addition, the load value information may comprise a maximum load value and/or a minimum load value for the candidate trajectory. The knowledge of the maximum load value is very advantageous since this value may be directly used by the user to dimension the attachment, such as the end effector.

The method may further comprise modifying the candidate trajectory based on the load values to provide a modified trajectory. The method may further comprise executing the modified trajectory by the manipulator. The method may however comprise modifying the candidate trajectory based on the load values to provide a modified trajectory without executing the candidate trajectory and/or the modified trajectory.

The modification of the candidate trajectory may comprise a modification of a configuration of the industrial robot, a modification of the candidate path, a modification of a speed of the candidate trajectory and/or a modification of an acceleration of the candidate trajectory.

The method may further comprise receiving, from the user, a constraint input defining a load constraint of the load values at the load location. In this case, the modification of the candidate trajectory may comprise modifying the candidate trajectory to provide a modified trajectory where the load values will meet the load constraints if the modified trajectory is executed. By defining a load constraint in this way, it can easily be ensured that the load values at the selected load location meet the load constraint. This variant is for example advantageous when the manipulator carries a sensitive attachment. Instead of changing or redesigning the end effector, the user can simply define the load constraint for a current end effector design. The control system takes this load constraint into consideration when providing the modified trajectory where the load values will meet the load constraints.

In this variant, the modification of the candidate trajectory to provide the modified trajectory may for example comprise modifying the candidate path, the candidate speed and/or the candidate acceleration of the candidate trajectory to provide the modified trajectory. The candidate path may for example be modified to reduce position dependent load values at the load location. The candidate speed and/or the candidate acceleration may for example be reduced. The candidate trajectory may be modified to provide the modified trajectory by means of optimization.

This variant is also particularly advantageous for material handling tasks of the manipulator since the load constraint can easily be defined in relation to properties of the payloads, such as masses of items to be picked and placed by the manipulator. For example, in order to ensure the structural integrity of fragile payloads, the load location may be defined in the payload and the load constraint may be defined based on the structural integrity of the payload. In this variant, the calculated load values do not necessarily have to be communicated to the user.

The load values may be emergency load values that will affect the load location if the candidate trajectory is executed and if an emergency brake of the manipulator is performed during execution of the candidate trajectory. Since the manipulator is typically relatively seldom subjected to an emergency brake, a load constraint of the emergency load values may be set higher than a load constraint of load values calculated for a successful execution of the candidate trajectory. The load constraint of the emergency load values may be based on a maximum load at the load location while the load constraint of load values calculated for a successful execution of the candidate trajectory may be based on fatigue loads at the load location. Thus, higher load values can be accepted for an emergency brake to obtain a short braking distance. The possibility to calculate such emergency load values is highly valuable since such loads are very difficult to predict with prior art solutions. The emergency brake may for example be a controlled emergency brake.

According to a second aspect, there is provided a control system for handling a manipulator of an industrial robot, the manipulator comprising a base member, a mounting interface and a kinematic chain between the base member and the mounting interface, the kinematic chain comprising the base member, the mounting interface and at least one controllable joint, the control system comprising at least one data processing device and at least one memory having a computer program stored thereon, the computer program comprising program code which, when executed by the at least one data processing device, causes the at least one data processing device to perform the steps of providing a candidate trajectory for the manipulator, the candidate trajectory being associated with a candidate path; receiving a load location input from a user, the load location input being associated with a load location associated with the industrial robot outside the kinematic chain; and calculating load values of a load parameter that will affect the load location if the candidate trajectory is executed.

The computer program may further comprise program code which, when executed by the at least one data processing device, causes the at least one data processing device to perform, or command performance of, any step according to the first aspect.

The control system may comprise a robot controller which in turn comprises a data processing device and a memory. The control system may further comprise a programming device. Also the programming device may comprise a data processing device and a memory. The programming device may be a teach pendant unit.

The computer program may comprise program code which, when executed by the at least one data processing device, causes the at least one data processing device to perform the steps of providing one or more load location parameters associated with the load location; and calculating the load values based on the one or more load location parameters.

The computer program may comprise program code which, when executed by the at least one data processing device, causes the at least one data processing device to perform the step of commanding communication of load value information associated with the load values to the user. The communication of load value information may comprise displaying the load value information. In this case, the display of load value information may comprise displaying the load values and/or visualizing indications of the load values.

The computer program may comprise program code which, when executed by the at least one data processing device, causes the at least one data processing device to perform the step of commanding visualization of the candidate path associated with the candidate trajectory. In this case, the load value information may be displayed in association with the candidate path.

The computer program may comprise program code which, when executed by the at least one data processing device, causes the at least one data processing device to perform the step of modifying the candidate trajectory based on the load values to provide a modified trajectory.

The modification of the candidate trajectory may comprise a modification of the candidate path, a modification of a speed of the candidate trajectory and/or a modification of an acceleration of the candidate trajectory.

The computer program may comprise program code which, when executed by the at least one data processing device, causes the at least one data processing device to perform the step of receiving, from the user, a constraint input defining a load constraint of the load values at the load location. In this case, the modification of the candidate trajectory may comprise modifying the candidate trajectory to provide a modified trajectory where the load values will meet the load constraints if the modified trajectory is executed.

The load values may be emergency load values that will affect the load location if the candidate trajectory is executed and if an emergency brake of the manipulator is performed during execution of the candidate trajectory.

According to a third aspect, there is provided an industrial robot comprising the manipulator and the control system according to the present disclosure. The industrial robot may be of any type as mentioned in connection with the first aspect and the control system may be of any type according to the second aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
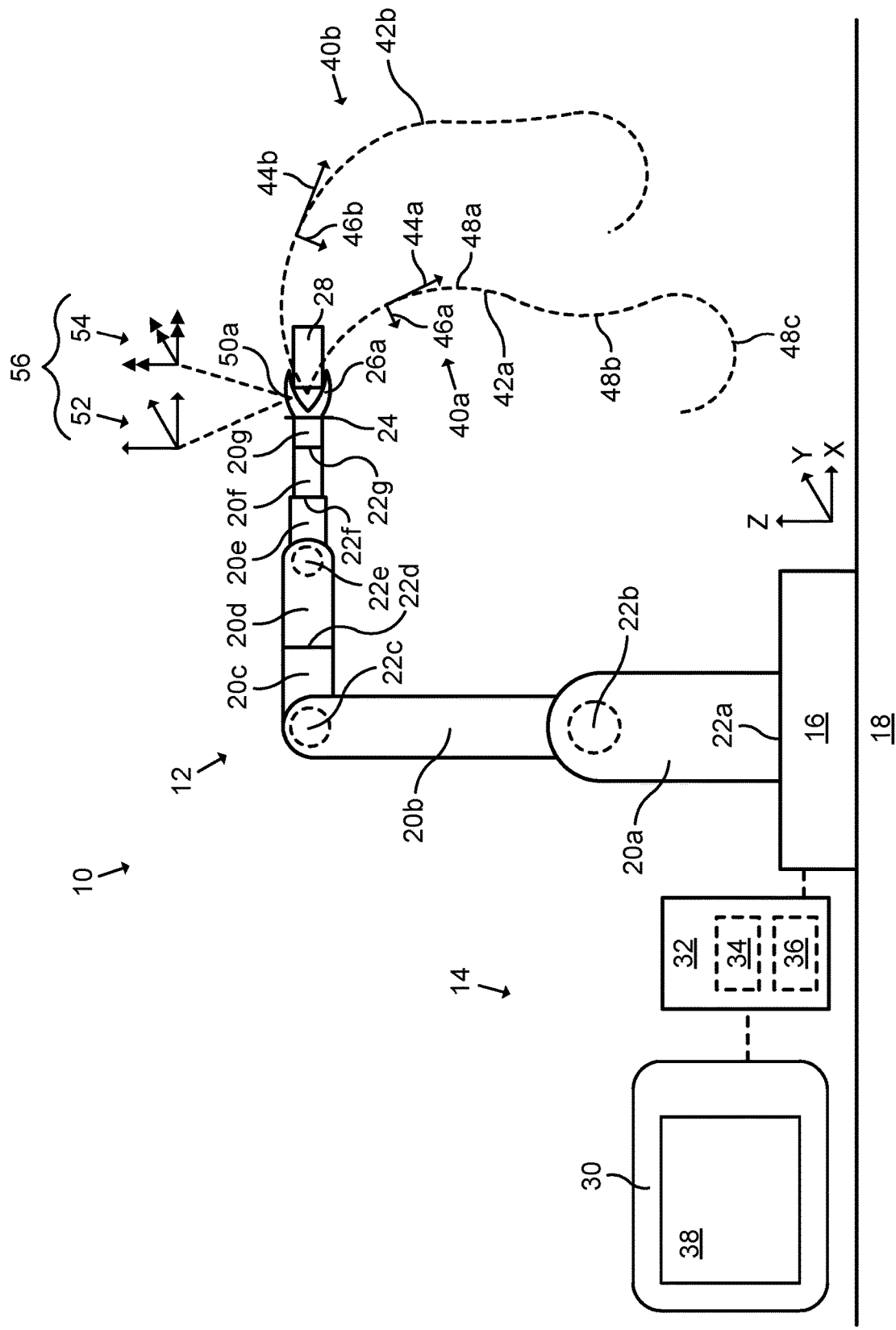
FIG. 1: schematically represents a side view of an industrial robot comprising a manipulator and a control system.

In the following, a method of handling a manipulator of an industrial robot, a control system for handling a manipulator of an industrial robot, and an industrial robot comprising a manipulator and a control system, will be described. The same or similar reference numerals will be used to denote the same or similar structural features.

FIG. 1 schematically represents a side view of an industrial robot 10. The industrial robot 10 comprises a manipulator 12 and a control system 14. FIG. 1 further shows a Cartesian coordinate system X, Y, Z for reference purposes.

The manipulator 12 of this specific example comprises seven axes. The manipulator 12 comprises a base member 16. In this example, the base member 16 is secured to a foundation 18. The foundation 18 is one example of an external structure according to the present disclosure.

The manipulator 12 further comprises a first link 20a rotatable relative to the base member 16 at a first joint 22a, a second link 20b rotatable relative to the first link 20a at a second joint 22b, a third link 20c rotatable relative to the second link 20b at a third joint 22c, a fourth link 20d rotatable relative to the third link 20c at a fourth joint 22d, a fifth link 20e rotatable relative to the fourth link 20d at a fifth joint 22e, a sixth link 20f translationally movable relative to the fifth link 20e at a sixth joint 22f, and a seventh link 20g rotatable relative to the sixth link 20f at a seventh joint 22g. One, several or all of the links 20a-20g may alternatively be referred to with reference numeral "20". One, several or all of the joints 22a-22g may alternatively be referred to with reference numeral "22". Each link 20 is driven at its joint 22 by means of an associated motor and an associated gearbox (not illustrated).

The manipulator 12 further comprises a tool flange 24. The tool flange 24 is one example of a mounting interface according to the present disclosure. The tool flange 24 is fixed to the seventh link 20g. The base member 16, the links 20 and the tool flange 24 form one example of a serial kinematic chain.

The industrial robot 10 further comprises an end effector 26a, here exemplified as a gripper. The end effector 26a is connected to the tool flange 24. The tool flange 24 thus provides an interface for the end effector 26a. The end effector 26a is one example of an attachment outside the kinematic chain of the manipulator 12.

In FIG. 1, the end effector 26a holds a payload 28. The payload 28 is thereby fixed to the end effector 26a. The payload 28 may be an item to be moved by the manipulator 12, e.g. in a pick and place operation. The payload 28 is a further example of an attachment outside the kinematic chain of the manipulator 12.

The control system 14 is in signal communication with the manipulator 12 for controlling operations thereof. The control system 14 of this specific example comprises a teach pendant unit, TPU, 30 and a robot controller 32. The robot controller 32 comprises a data processing device 34 and a memory 36. The memory 36 has a robot program stored thereon. The robot program comprises program code which, when executed by the data processing device 34, causes the data processing device 34 to perform, and/or command performance of, various steps as described herein. The robot program further comprises a path planner and robot simulation software.

The TPU 30 comprises a display 38. Also the TPU 30 comprises a data processing device and a memory (not illustrated). The TPU 30 is in signal communication with the robot controller 32. The TPU 30 is one example of a programming device according to the present disclosure.

In FIG. 1, a candidate trajectory 40a is shown. The candidate trajectory 40a may for example be defined by a user, e.g. by means of the TPU 30, or may be generated by the path planner. The candidate trajectory 40a comprises an associated candidate path 42a, an associated speed 44a and an associated acceleration 46a, as schematically illustrated in FIG. 1. A trajectory thus differs from a path by comprising more information than merely the path, such as a speed profile and/or an acceleration profile along the path. The candidate trajectory 40a may also be considered to include the end effector 26a and/or the payload 28. The candidate path 42a may for example be followed by a tool center point, TCP, if executing the candidate trajectory 40a. The candidate path 42a of this example comprises three movement segments 48a-48c. Each movement segment 48a-48c may be an interpolation between two adjacent target points.

FIG. 1 further shows one example of a modified trajectory 40b. The modified trajectory 40b comprises an associated modified path 42b, an associated modified speed 44b and an associated modified acceleration 46b, as schematically illustrated in FIG. 1. The speeds 44a and 44b may alternatively be referred to with reference numeral "44". The accelerations 46a and 46b may alternatively be referred to with reference numeral "46". FIG. 1 further shows one example of a load location 50a associated with the industrial robot 10. FIG. 1 further schematically indicates forces 52 and torques 54 acting at the load location 50a. The forces 52 and torques 54 are examples of load parameters 56 according to the present disclosure. The load location 50a is here positioned in the end effector 26a. The load location 50a is a location of interest for the user outside the kinematic chain of the manipulator 12. The load location 50a experiences forces 52 and torques 54 from the manipulator 12 when the candidate trajectory 40a is executed by the manipulator 12.

In most cases, the user is aware of an intended implementation for the industrial robot 10. For example, movements of the manipulator 12 in a pick and place application are at least approximately known. The user may for example also know if the intended implementation involves many reorientations of the end effector 26a.

Figure 2:
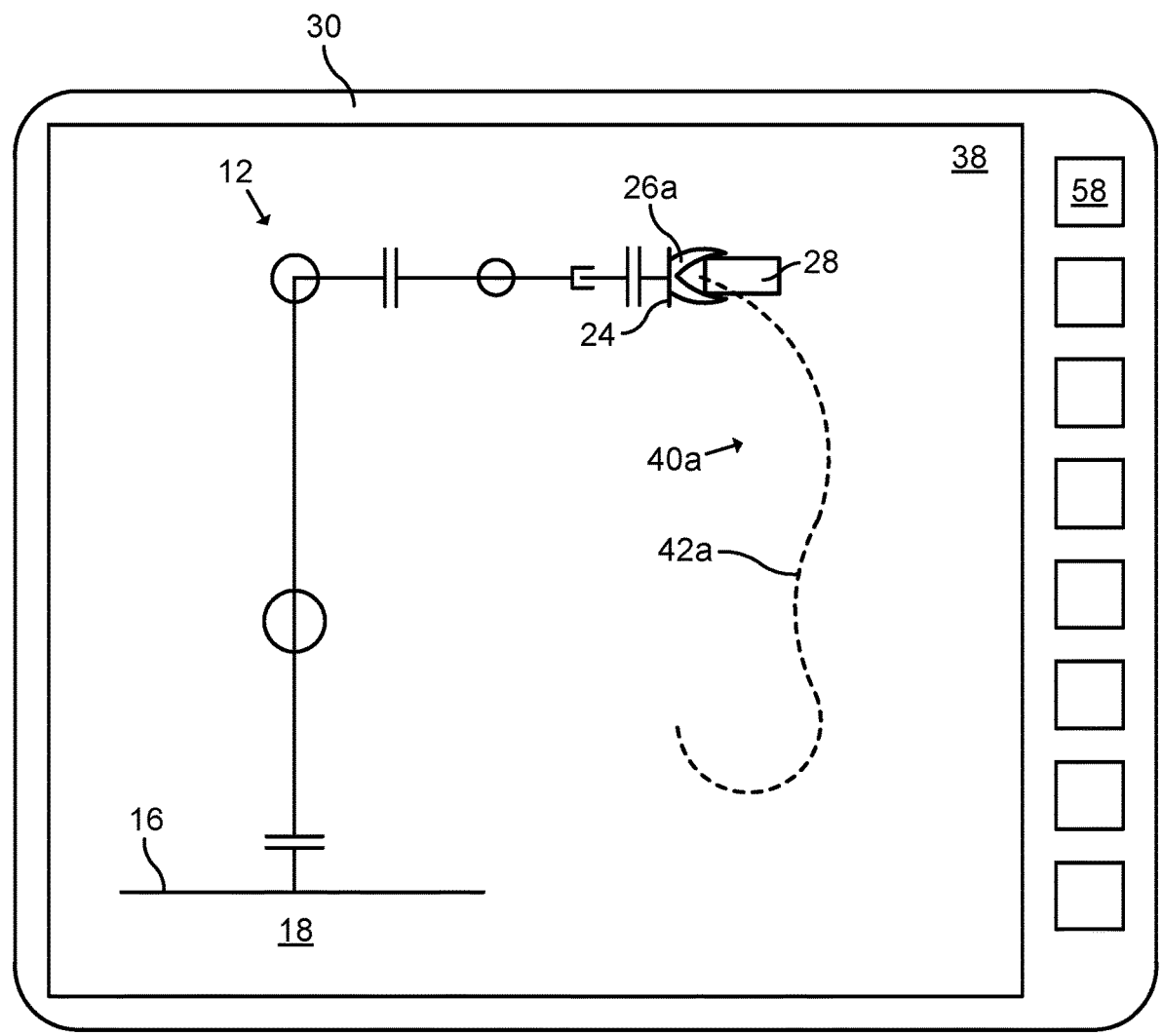
FIG. 2: schematically represents the programming device when visualizing the manipulator and a candidate path associated with a candidate trajectory.

FIG. 2 schematically represents the TPU 30. In the specific example in FIG. 2, the TPU 30 visualizes the foundation 18, the manipulator 12, the end effector 26a, the payload 28 and the candidate path 42a associated with the candidate trajectory 40a.

The teach pendant unit 16 of this example further comprises a plurality of buttons 58. By means of the buttons 58, the user can provide various user inputs. Alternatively, or in addition, the display 38 may be a touchscreen by means of which the user can provide various user inputs.

Figure 3:
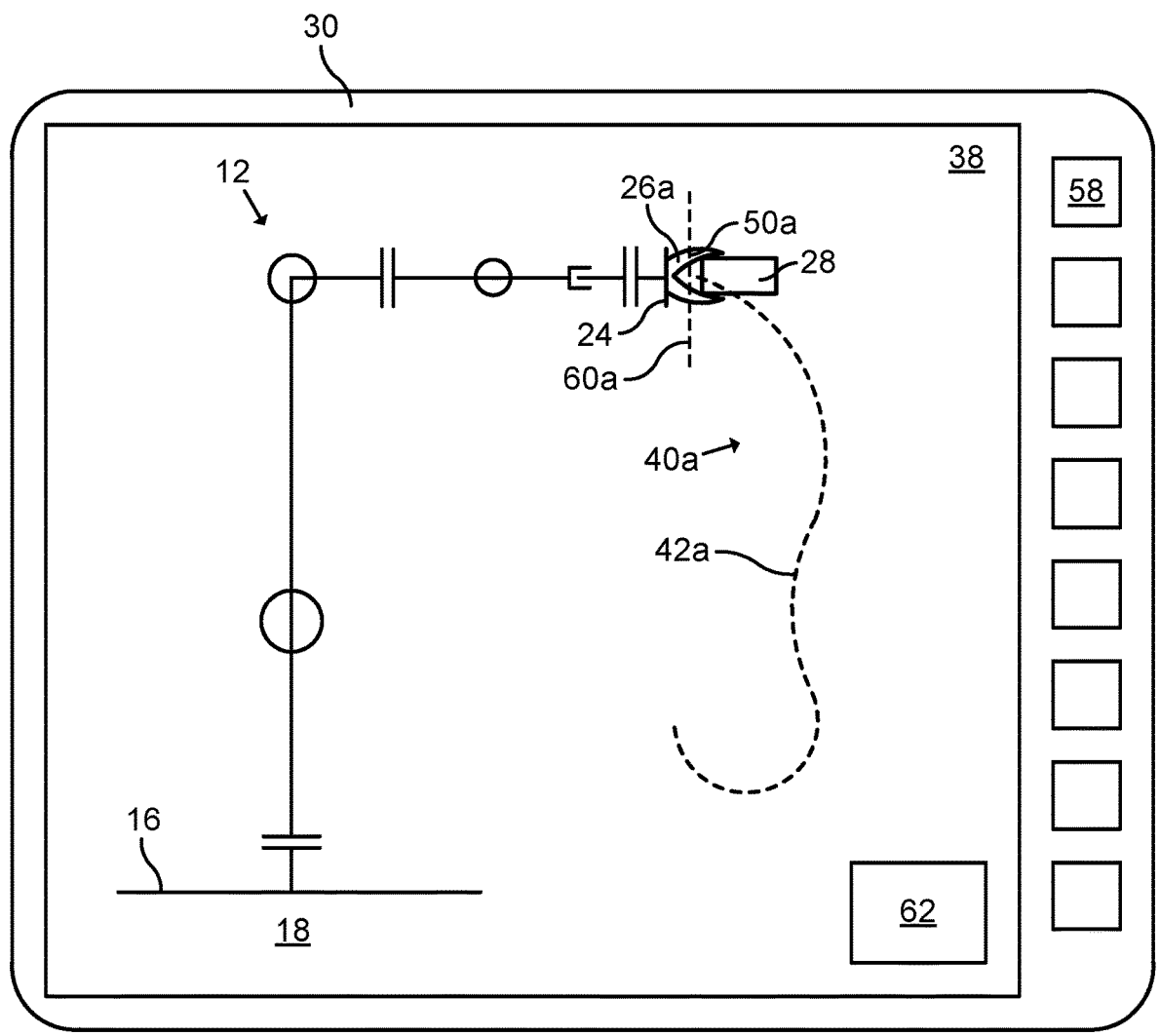
FIG. 3: schematically represents the programming device when a user provides a load location input.

FIG. 3 schematically represents a further view of the TPU 30. In order to obtain information about one or more load parameters 56 in the end effector 26a and to see if the end effector 26a is properly dimensioned, the user provides a load location input 60a. In this example, the load location input 60a involves positioning a line representing a cross-section in the end effector 26a as visualized on the display 38. The user may then confirm the selection with one of the buttons 58. The positioning of the line and the pushing on one of the buttons 58 constitute one of many examples of a load location input 60a provided by the user. By means of the load location input 60a, the load location 50a is defined by the user. The load location input 60a is thus associated with the load location 50a.

As indicated in FIG. 3, the user also inputs load location parameters 62. The load location parameters 62 can be various types for characterizing the load location 50a. Examples of load location parameters 62 include mass, inertia, center of gravity, stiffness and/or compliance of the attachment outside the kinematic chain, i.e. the end effector 26a in this example. By means of the input of load location parameters 62, the user can define a wide range of parameters associated with the end effector 26a. Thus, for the purpose of calculating load values, no physical end effector 26a needs to be attached to the manipulator 12.

In a further example, an end effector model of the end effector 26a is provided. The end effector model may be provided in various ways. The end effector model may for example be defined by the user, determined by empirical tests or may be downloaded from the Internet. The end effector model may comprise one or more rigid bodies. In case the load location 50a is a cross-section, the end effector model may comprise one or more rigid bodies on each side of the cross-section. In this case, load location parameters 62 can be defined for each rigid body.

In a further example, a payload model of the payload 28 is provided. Alternatively, or in addition, load location parameters 62 associated with the payload 28 may be input by the user.

In this example, a manipulator model of the manipulator 12 is also provided. By using a manipulator model, also position dependent terms and speed dependent terms can be considered when calculating the load values. In the following, one example of a manipulator model will be described.

Given a proposed candidate trajectory 40a, a vector $\tau_k$ comprising one or more load parameters 56 can be calculated in every timestep along the candidate path 42a by means of the manipulator model as:

$$\tau_k + \tau_{k,\ddot{q}} + \tau_{k,\dot{q}} + \tau_{k,q} \tag{1}$$

where $\tau_k$ is a vector of forces 52 and torques 54 when considering the complete dynamics of the manipulator 12 or a vector of three forces 52 and three torques 54, also referred to as a wrench, when expressing the dynamics with respect to one cross section, a joint 22 or some other coordinate system in the structure of the manipulator 12.

The vector q and its derivatives represent the positions of the joints 22, the speeds 44 of the joints 22 and the accelerations 46 of the joints 22.

$\tau_{k,\ddot{q}}$ is an acceleration term of the manipulator model that may alternatively be written as $M_k(q)\ddot{q}$.

$M_k(q)$ is the inertia matrix which depends on the positions of the joints 22. The inertia matrix is one example of an inertia dependent term defining an inertia of the manipulator 12.

$\tau_{k,\dot{q}}$ is a speed term of the manipulator model that may alternatively be written as $C_k(q,\dot{q})$. $C_k(q,\dot{q})$ may inter alia represent the centripetal load of the manipulator 12.

$\tau_{k,q}$ is a position term of the manipulator model that may alternatively be written as $g_k(q)$.

$g_k(q)$ represents a position dependent load term of the manipulator 12, here exemplified as a gravity dependent load term. The manipulator model thus describes both static and dynamic properties of the manipulator 12.

Equation (1) can alternatively be written as:

$$\tau_k = M_k(q)\ddot{q} + C_k(q,\dot{q}) + g_k(q)$$

In addition, a friction term can also be added to the manipulator model. Such friction term typically depends on the speeds 44 of the joints 22 but could also depend on the positions of the joints 22. By means of the manipulator model, load parameters 56 can be calculated at arbitrary points in the manipulator 12, and at arbitrary load locations 50a in bodies that lie outside the kinematic chain but that are fixed to a part of the manipulator 12, for any candidate trajectory 40a. However, in case the speeds 44, the accelerations 46 and any forces that will affect the load location 50a if the candidate trajectory 40a is executed are known, the manipulator model can be avoided.

Based on the candidate trajectory 40a, the load location parameters 62 and the manipulator model, the robot simulation software in the robot controller 32 calculates the load values for every timestep of the candidate trajectory 40a at the load location 50a selected by the user. It is however also possible that the load values are calculated by another part of the control system 14, such as by the TPU 30.

In one specific example, the candidate trajectory 40a may comprise pushing the end effector 26a (or the payload 28 carried by the end effector 26a) against a stationary structure. The end effector may for example be a polishing tool that is pushed against the stationary structure with a certain force. The method may also calculate load values at the load location 50a for such scenarios where the manipulator 12 is subjected to external loads if the candidate trajectory 40a is executed.

Figure 4:
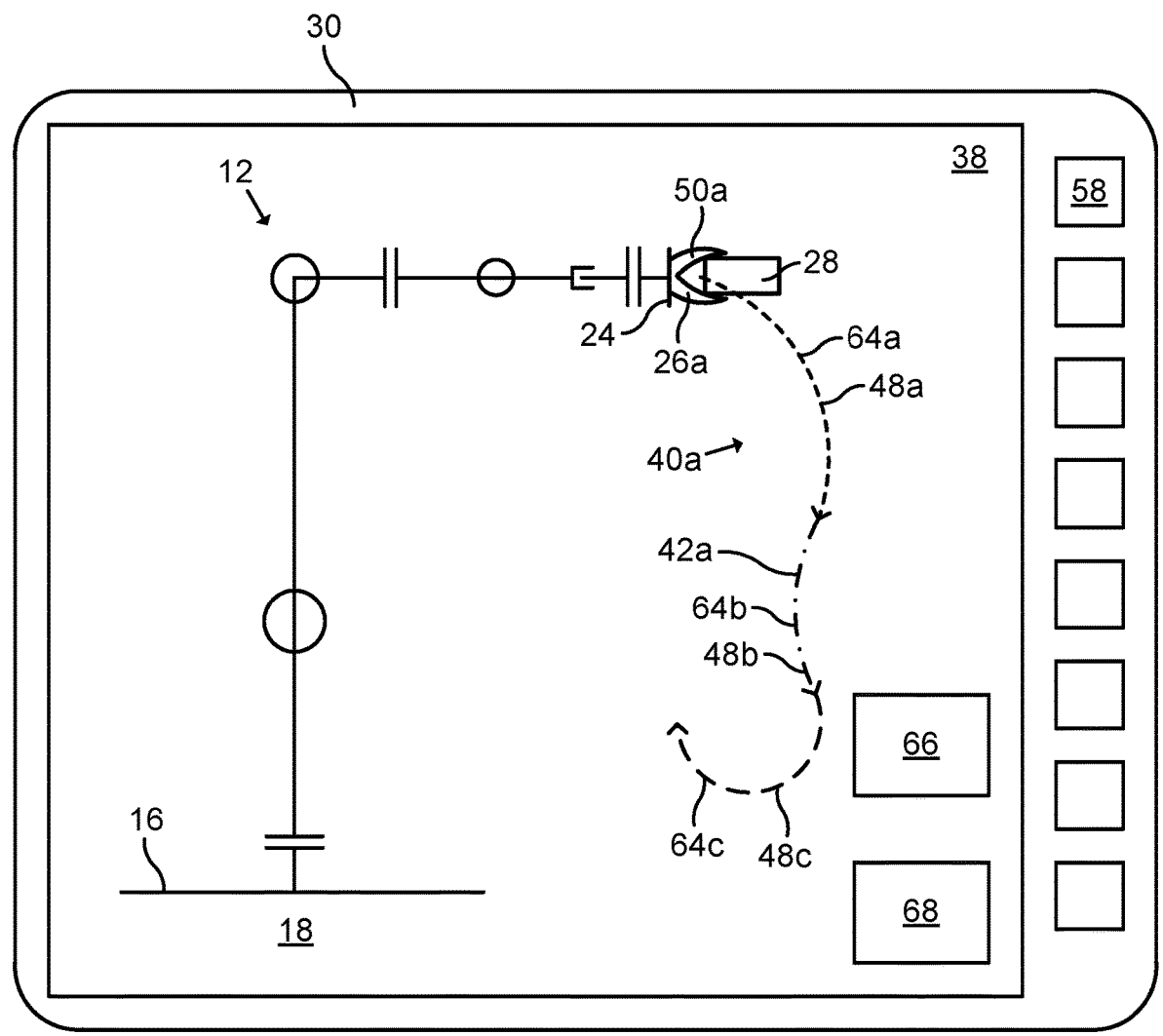
FIG. 4: schematically represents the programming device when visualizing indications of load values for the candidate trajectory.

FIG. 4 schematically represents a further view of the TPU 30. In FIG. 4, load values of the load parameters 56, that will affect the load location 50a if the candidate trajectory 40a is executed, have been calculated. Based on the calculated load values in the load location 50a, load value information associated with the load values are displayed and thereby communicated to the user.

In this specific example, the load value information comprises three different visual indications 64a-64c on the display 38. Each indication 64a-64c is here exemplified as a particular hatching of the line illustrating a movement segment 48a-48c of the candidate path 42a. Thus, both the candidate path 42a and load values associated with the candidate path 42a are visualized on the display 38 in this example. The different hatchings of the indications 64a-64c represents different load values, or different ranges of load values, of the load parameter 56 that will affect the load location 50a if executing the candidate trajectory 40a. The hatchings of the second and third movement segments 48b and 48c may represent critical load values at the load location 50a, while the hatching of the first movement segment 48a may represent acceptable load values at the load location 50a. As one of many alternatives to the different hatchings, each movement segment 48a-48c may be illustrated with a particular color, for example representing different ranges of the load values.

In FIG. 4, box 66 indicates a display of several or all of the calculated load values, for example as a table. As indicated in FIG. 4, a maximum load value 68 of the load parameter 56 that will affect the selected load location 50a if the candidate trajectory 40a is executed, is also displayed.

The indications 64a-64c intuitively informs the user of the load values at the selected load location 50a for the candidate trajectory 40a. The user can thereby easily understand the rating of the end effector 26a in relation to the candidate trajectory 40a. If the rating is too low, the end effector 26a can be redesigned or replaced to provide an increased rating and/or the candidate trajectory 40a can be modified to reduce performance (e.g. by reducing speeds 44a and/or accelerations 46a). If the rating is too high, the end effector 26a can be redesigned or replaced to provide a reduced rating and/or the candidate trajectory 40a can be modified to increase performance (e.g. by increasing speeds 44a and/or accelerations 46a). In any case, the load value information intuitively guides the user to provide an optimal design of the end effector 26a in view of the candidate trajectory 40a. The load value information provided to the user also enables the user to easily and accurately verify a design of the end effector 26a for a robot program that is actually planned to be used.

A further example of load values of the load parameter 56 is emergency load values, i.e. load values that will affect the load location 50a if an emergency brake is initiated along the candidate path 42a. For example, for each point along the candidate path 42a, the emergency load value may indicate a maximum load value 68 if an emergency brake would be initiated in that point. The emergency load values may also be displayed on the display 38, for example by means of indications corresponding to the indications 64a-64c for load values calculated for a successful execution of the candidate trajectory 40a. When executing the candidate trajectory 40a by the manipulator 12 and the emergency brake is initiated, the manipulator 12 may or may not follow the candidate path 42a after initiation of the emergency brake.

Figure 5:
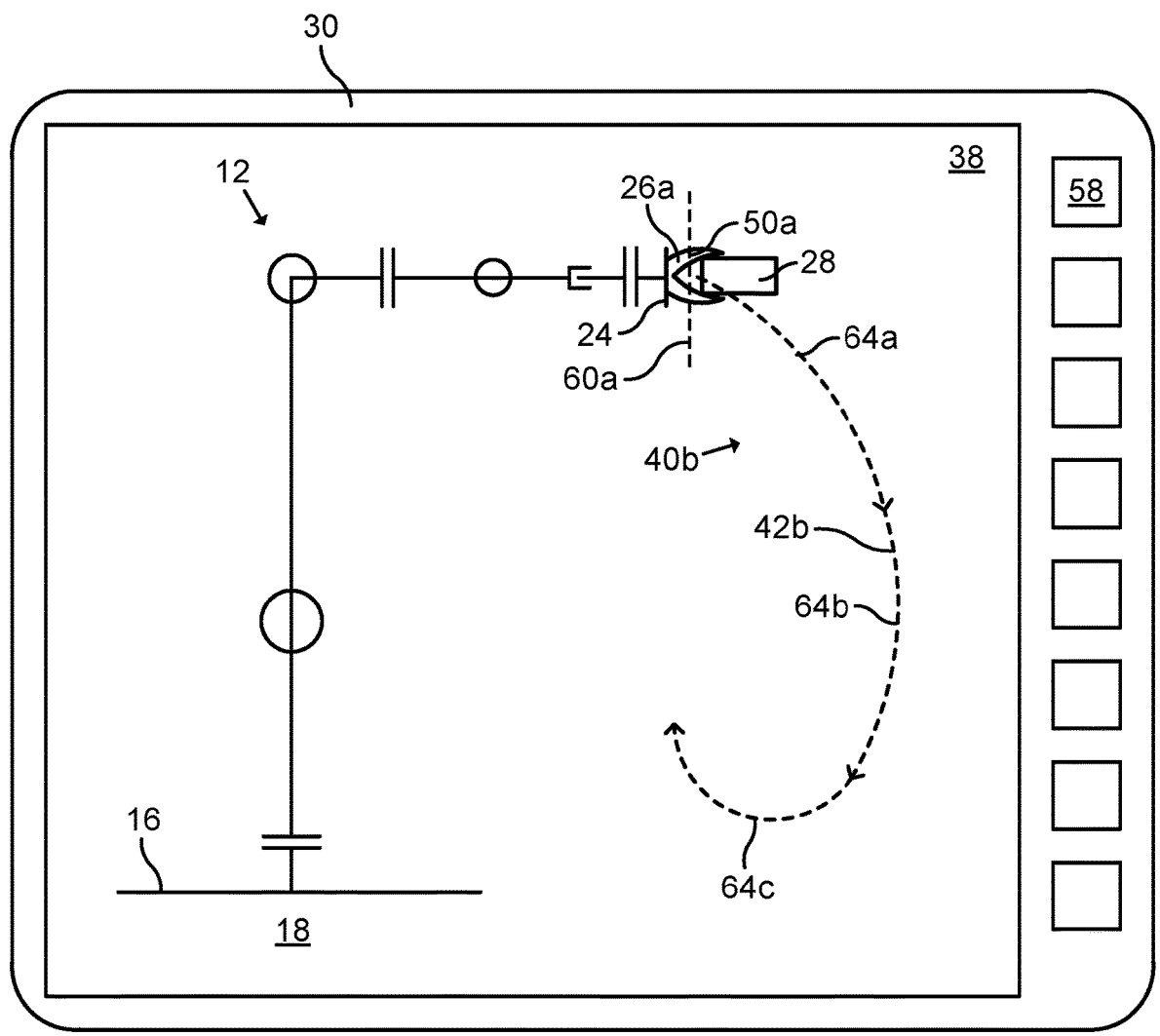
FIG. 5: schematically represents the programming device when visualizing a modified path associated with a modified trajectory and indications of load values associated with the modified trajectory.

FIG. 5 schematically represents a further view of the TPU 30. In FIG. 5, the candidate trajectory 40a has been modified based on the calculated load values to provide a modified trajectory 40b. The robot program comprises software for optimizing the candidate trajectory 40a with a dynamic optimization to provide a modified trajectory 40b. The modified path 42b of the modified trajectory 40b differs from the candidate path 42a of the candidate trajectory 40a. Updated load values, that will affect the load location 50a selected by the user if the modified trajectory 40b is executed, have been calculated. The TPU 30 now displays load value information associated with these updated load values. As shown in FIG. 5, the hatchings of the indications 64a-64c of each movement segment of the modified path 42b are the same, here representing an acceptable level of load values at the load location 50a for the modified trajectory 40b. Thus, the modified trajectory 40b provided by the robot program has reduced the load values at the load location 50a in comparison with the candidate trajectory 40a. The modified trajectory 40b is then executed by the manipulator 12.

Figure 6:
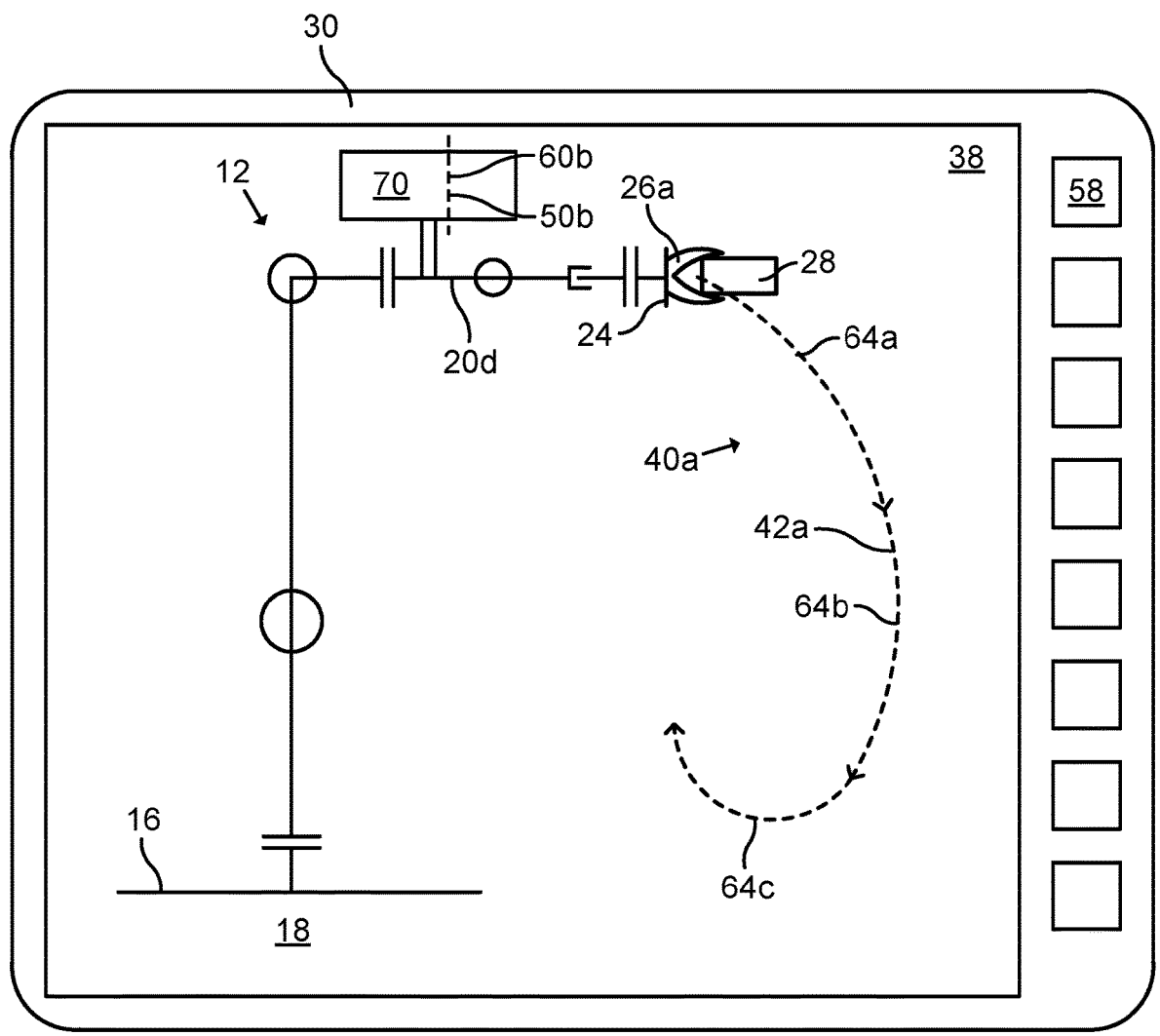
FIG. 6: schematically represents the programming device when a user provides a further example of a load location input.

FIG. 6 schematically represents a further view of the TPU 30. In FIG. 6, a painting device 70 is rigidly connected to the fourth link 20d. The painting device 70 is one of many examples of an attachment connected to an intermediate link 20 and arranged in parallel with the kinematic chain of the manipulator 12.

In order to obtain information about one or more load parameters 56 in the painting device 70, the user provides a load location input 60b. The load location input 60b of this example comprises positioning a line representing a cross-section in the painting device 70 as visualized on the display 38. The user may then confirm the selection with one of the buttons 58. By means of the load location input 60b, a further example of a load location 50b is defined by the user. The load location input 60b is thus associated with the load location 50b in the painting device 70. The method then proceeds with calculating load values of the load parameters 56 that will affect the load location 50b if the candidate trajectory 40a is executed. Load value information associated with these load values may then be displayed to the user as described herein. In this way, the user can intuitively be informed of the load values that will affect the painting device 70 if the candidate trajectory 40a is executed.

The painting device 70 may further comprise an atomizer (not illustrated) connected to the tool flange 24. The atomizer may in turn comprise a bell cup. By means of the method, load values of the load parameters 56 that will affect the bell cup can also be calculated and displayed.

Figure 7:
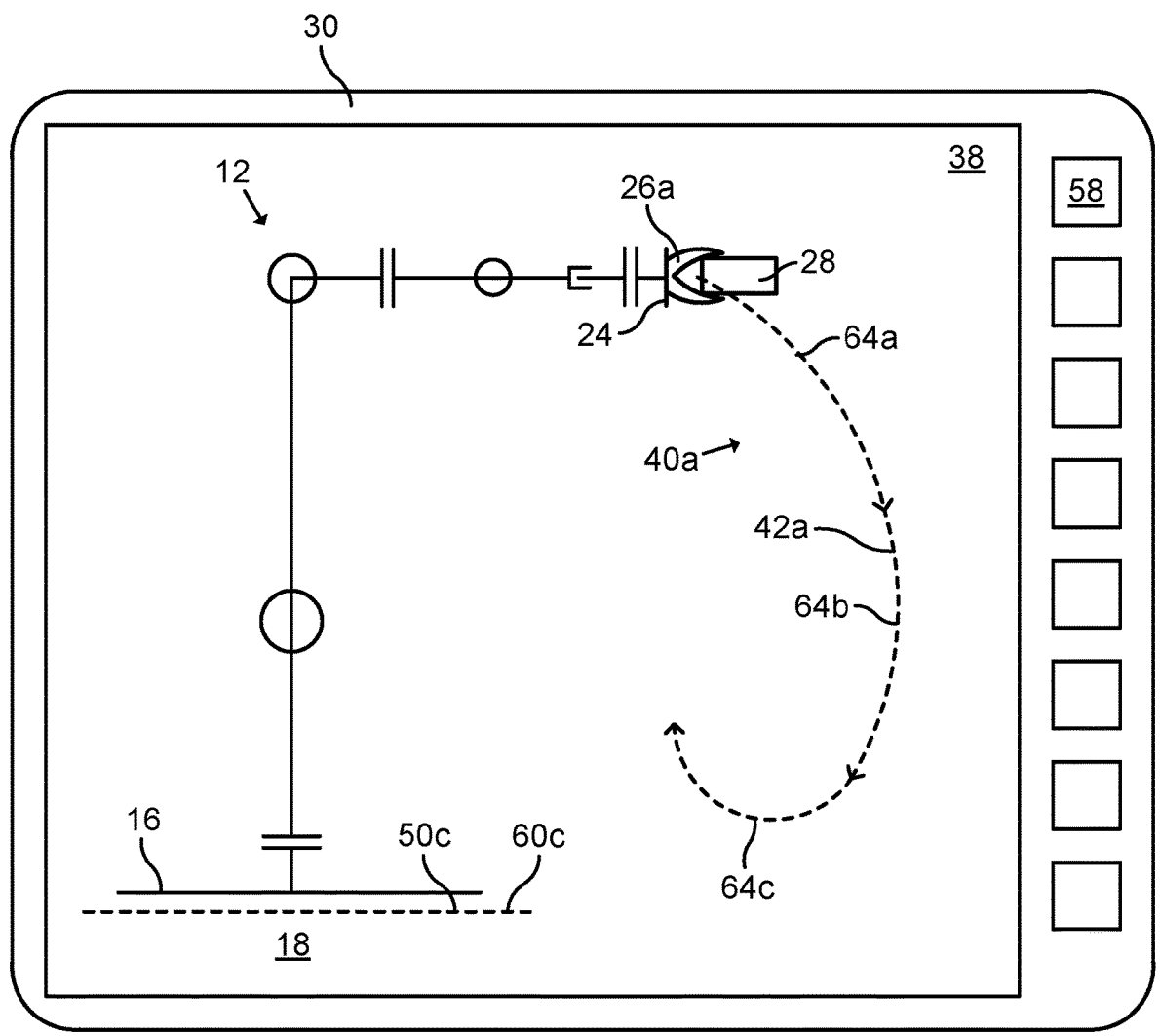
FIG. 7: schematically represents the programming device when a user provides a further example of a load location input.

FIG. 7 schematically represents a further view of the TPU 30. In order to obtain information about one or more load parameters 56 in the foundation 18, the user provides a load location input 60*c*. The foundation 18 is one example of an external structure proximal of the kinematic chain and in series with the kinematic chain of the manipulator 12.

The load location input 60*c* of this example comprises positioning a line representing a cross-section in the foundation 18 as visualized on the display 38. The user may then confirm the selection with one of the buttons 58. By means of the load location input 60*c*, a further example of a load location 50*c* is defined by the user. The load location input 60*c* is thus associated with the load location 50*c* in the foundation 18. The method then proceeds with calculating load values of the load parameters 56 that will affect the load location 50*c* if the candidate trajectory 40*a* is executed. Load value information associated with these load values may then be displayed to the user as described herein. In this way, the user can intuitively be informed of the load values that will affect the foundation 18 if the candidate trajectory 40*a* is executed.

Figure 8:
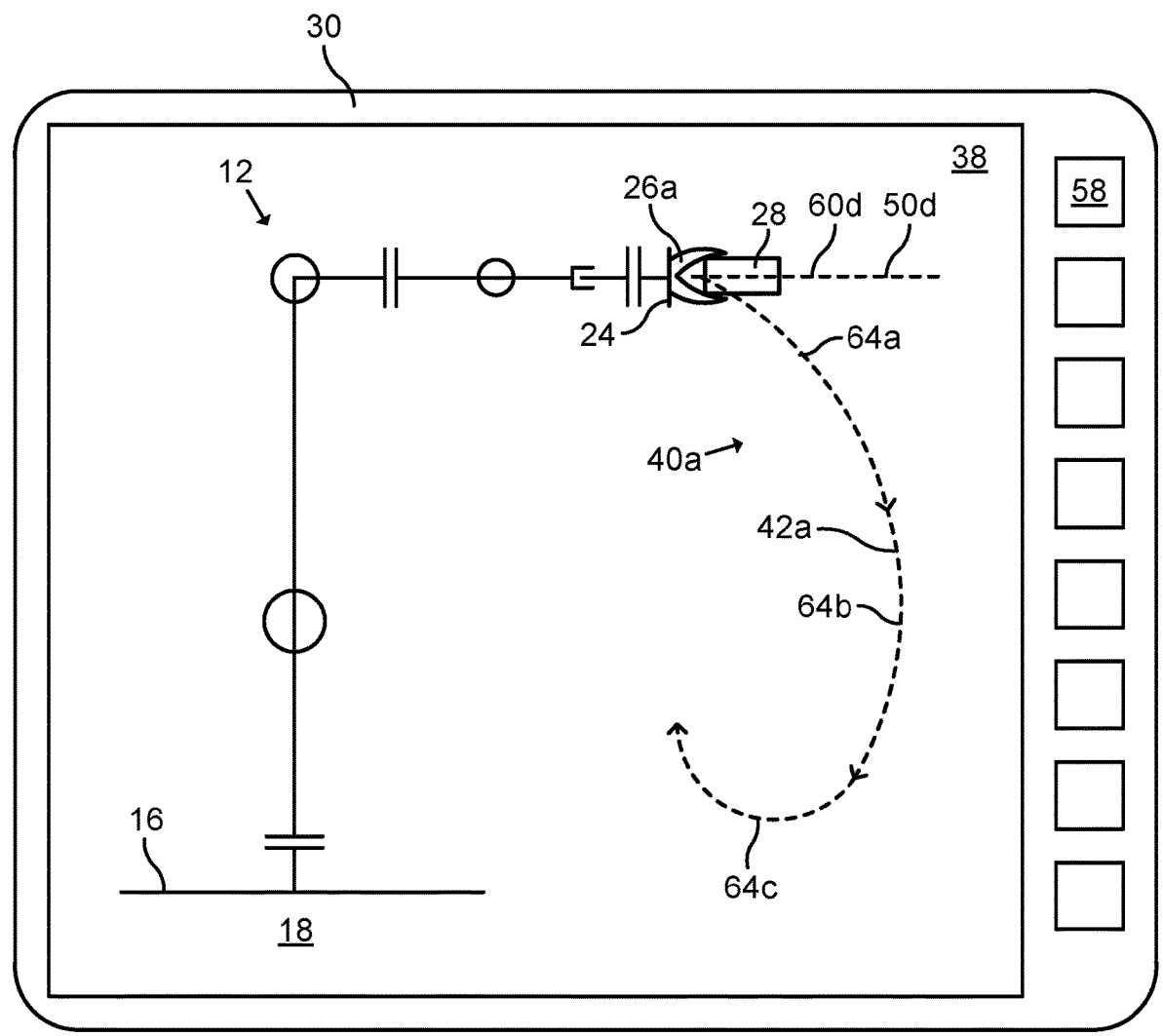
FIG. 8: schematically represents the programming device when a user provides a further example of a load location input.

FIG. 8 schematically represents a further view of the TPU 30. In order to obtain information about one or more load parameters 56 in the payload 28, the user provides a load location input 60*d*. The load location input 60*d* of this example comprises positioning a line representing a cross-section in the payload 28 as visualized on the display 38. The user may then confirm the selection with one of the buttons 58. By means of the load location input 60*d*, a further example of a load location Sod is defined by the user. The load location input 60*d* is thus associated with the load location Sod in the payload 28. The method then proceeds with calculating load values of the load parameters 56 that will affect the load location Sod if the candidate trajectory 40*a* is executed. Load value information associated with these load values may then be displayed to the user as described herein. In this way, the user can intuitively be informed of the load values that will affect the payload 28 if the candidate trajectory 40*a* is executed.

In case the load values at the load location Sod in the payload 28 are high, there is a risk that the manipulator 12 will drop the payload 28 when executing the candidate trajectory 40*a*. In this example, load location parameters 62 may further include friction between the end effector 26*a* and the payload 28 and/or a holding force by the end effector 26*a*, such as a gripping force. The user can for example easily see if the holding force needs to be adjusted or if it would help if another material with different friction coefficient is provided on the end effector 26*a* and/or on the payload 28.

Figure 9:
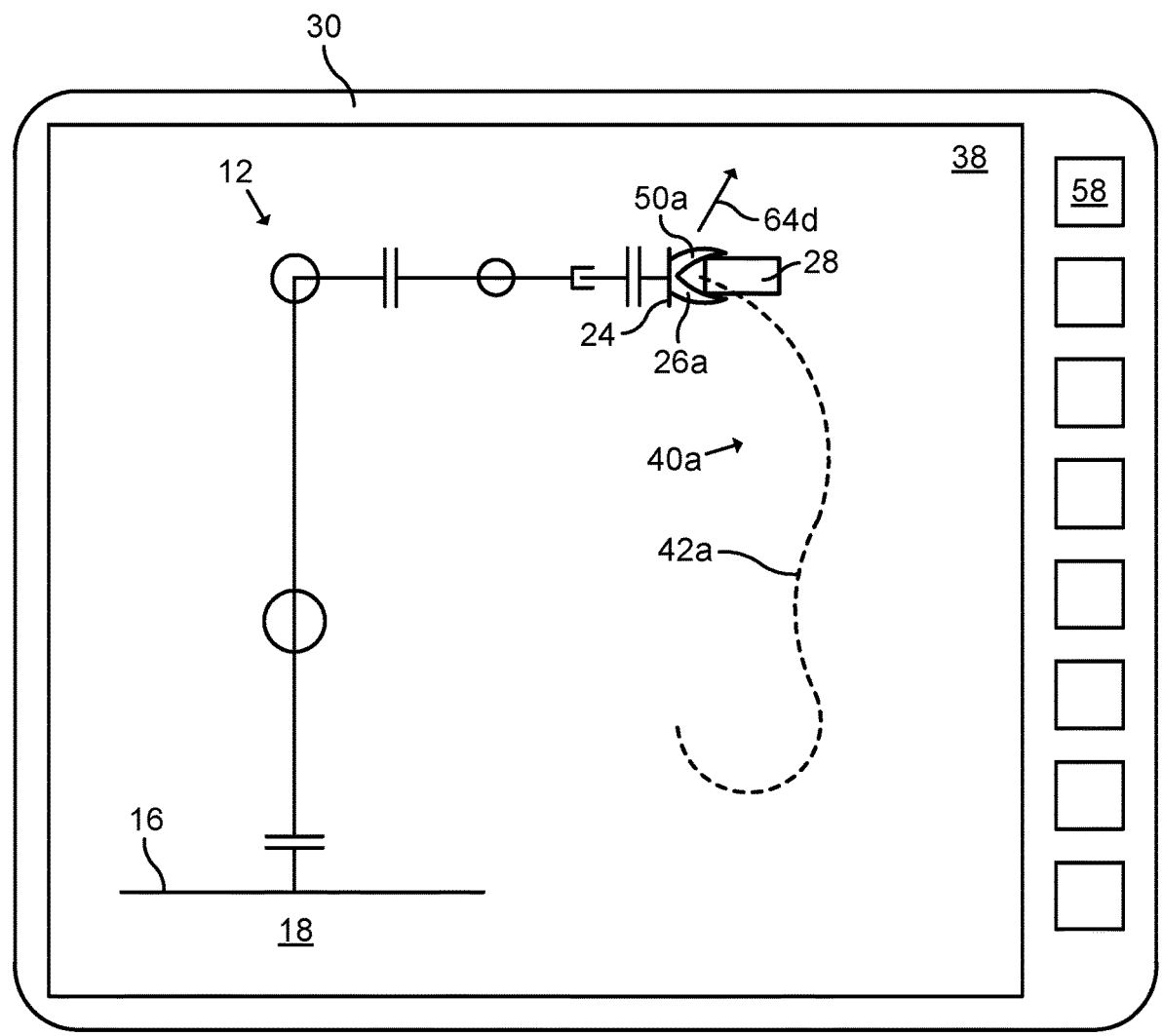
FIG. 9: schematically represents the programming device when visualizing indications of load values for the candidate trajectory according to a further example.
Figure 10:
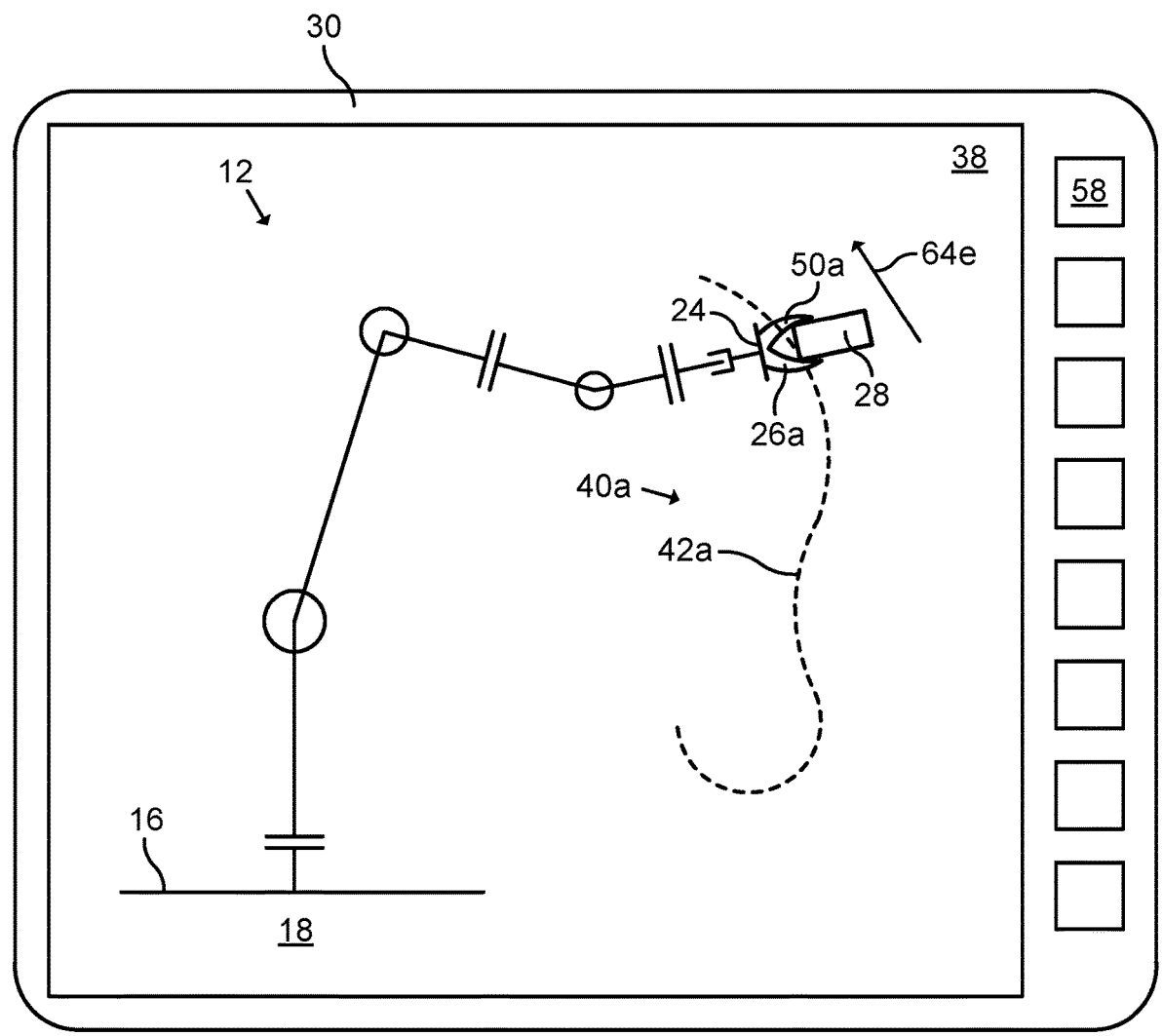
FIG. 10: schematically represents the programming device when visualizing indications of load values according to FIG. 9 and during a simulated movement of the manipulator.

FIGS. 9 and 10 each represents further views of the TPU 30. FIGS. 9 and 10 show further examples of visual indications 64*d* and 64*e* of the load values that will affect the load location 50*a* in the end effector 26*a* if the candidate trajectory 40*a* is executed. The indications 64*d* and 64*e* are here exemplified as arrows whose magnitudes and directions represent the magnitude and direction of the load value at each point along the candidate path 42*a*. The color of the indications 64*d* and 64*e* may also differ in dependence of the load values. In FIGS. 9 and 10, a movement simulation of the manipulator 12 along the candidate path 42*a* is also visualized together with the display of the indications 64*d* and 64*e* of the load values.

Figure 11:
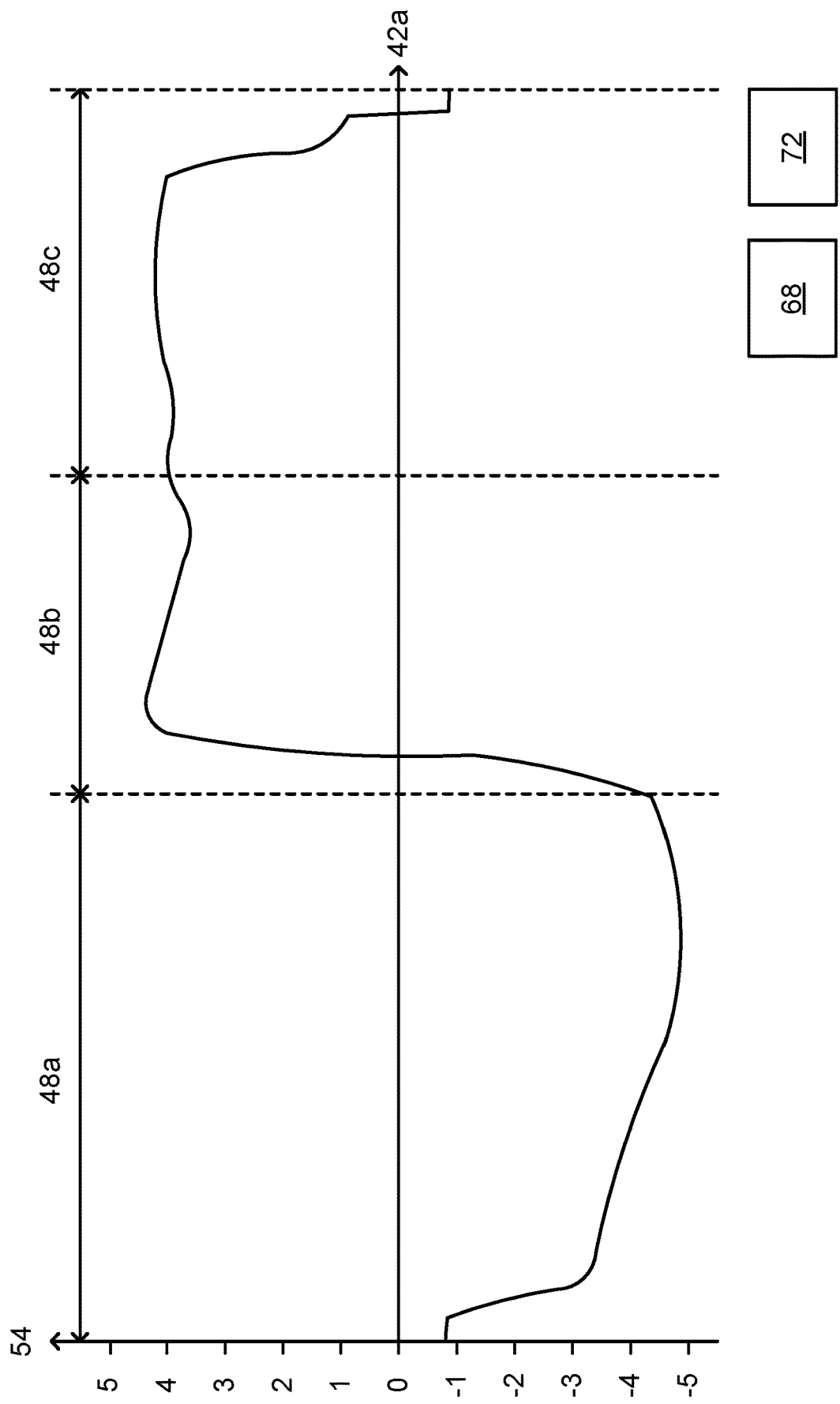
FIG. 11: schematically represents a graph of calculated load values.

FIG. 11 schematically represents a graph of calculated load values, here exemplified as load values of torque 54 at the load location 50*a* (or 50*b*-50*d*) selected by the user if the candidate trajectory 40*a* is executed. The graph may be shown on the display 38. In this example, the abscissa corresponds to the candidate path 42*a*. The abscissa may alternatively represent time. The graph also shows the movement segments 48*a*-48*c* of the candidate path 42*a*. In this way, the user can easily see if a particular movement segment 48*a*-48*c* provides a critical load value of the load parameter 56. A maximum load value 68 and a minimum load value 72 of the load value at the selected load location 50*a* are also be displayed, e.g. as numbers.

Figure 12:
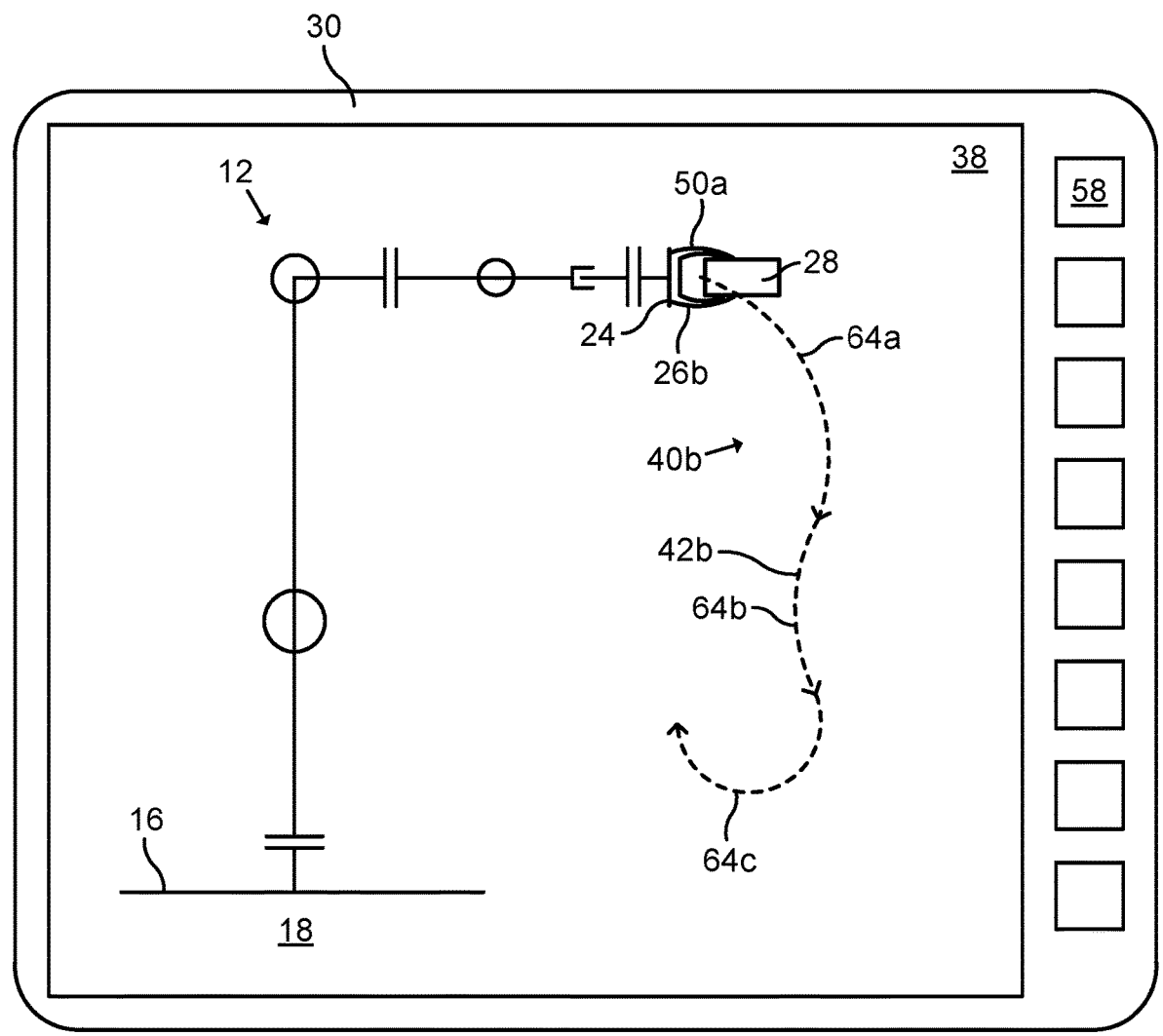
FIG. 12: schematically represents the programming device when visualizing indications of load values for a further example of a modified trajectory.

FIG. 12 schematically represents a further view of the TPU 30. In FIG. 12, the candidate trajectory 40*a* has been modified to provide a modified trajectory 40*b* by selecting a different type of end effector 26*b* with a rating different from the end effector 26*a*. Thus, a configuration of the industrial robot 10 has changed. A load location 50*a* in the end effector 26*b* is then selected by the user, load values for the modified trajectory 40*b* are calculated and load value information associated with the load values are displayed. As shown in FIG. 12, the candidate path 42*a* has the same geometry as the candidate path 42*a*, e.g. in FIG. 4. However, due to the different rating of the end effector 26*b*, the load values at the selected load location 50*a* are less critical, as shown by the hatchings of the indications 64*a*-64*c*. The modified trajectory 40*b* is then executed by the manipulator 12.

Figure 13:
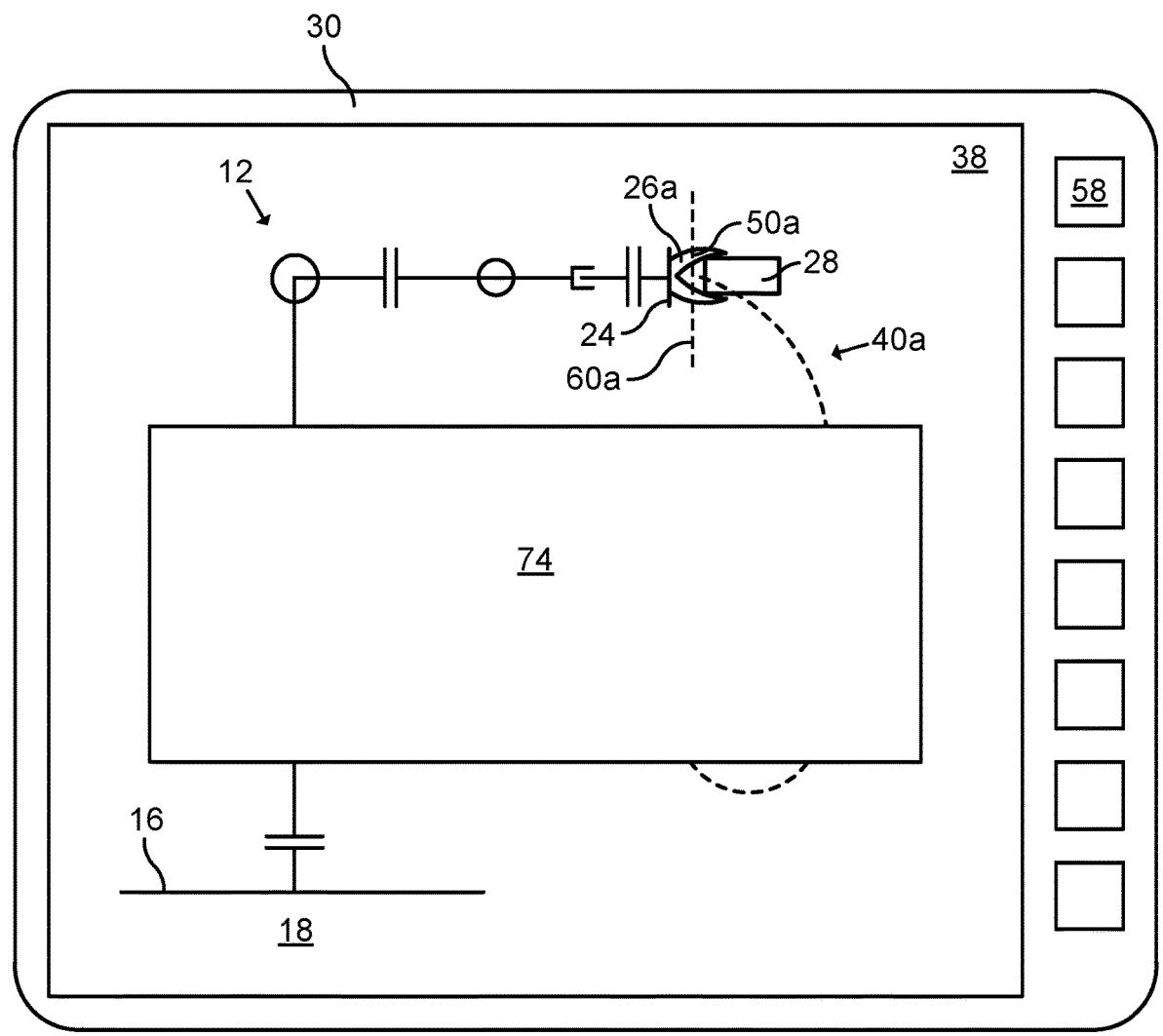
FIG. 13: schematically represents the programming device when a user inputs a constraint input.

FIG. 13 schematically represents a further view of the TPU 30. In FIG. 13, the user enters a constraint input 74. The constraint input 74 defines a load constraint of the load values in the selected load location 50*a*. Thus, in this example, the load location input 60*a* is a cross-section showing where the load values should be limited. The load constraint may be determined in view of fatigue, in view of a maximum load (e.g. at an emergency stop) and/or in view of a slipping force between the end effector 26*a* and the payload 28. In case the end effector 26*a* is sensitive to loads, the constraint input 74 may define a load constraint taking this sensitivity into consideration. Although the constraint input 74 is here exemplified as a dialog box, a wide range of ways for the user to input load constraints of load values in the selected load location 50*a* are possible.

Based on the candidate trajectory 40*a*, the robot controller 32 then determines a modified trajectory 40*b* for the manipulator 12 by solving an optimization problem having an objective function and the load constraint. The objective function may for example be to minimize time, but it could alternatively be to minimize energy consumption, noise or mechanical fatigue. The load constraint of the load values can for example be met by reducing speeds 44 and accelerations 46.

Figure 14:
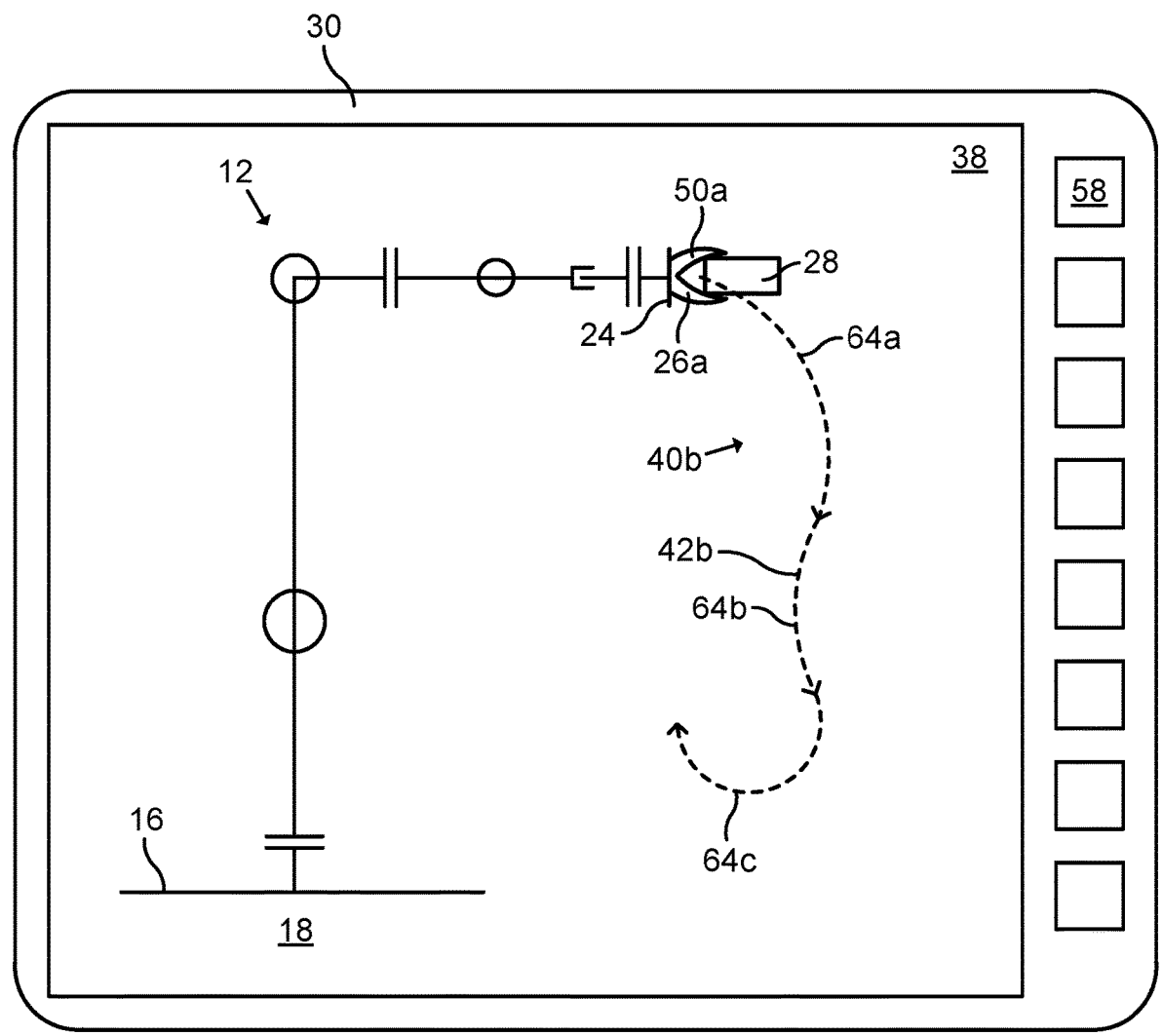
FIG. 14: schematically represents the programming device when visualizing indications of load values for a modified trajectory that is modified based on the constraint input.

FIG. 14 schematically represents a further view of the TPU 30. In FIG. 14, indications 64*a*-64*c* of load values are visualized on the display 38 for the modified trajectory 40*b* that is modified based on the constraint input 74. As shown in FIG. 14, the modified path 42*b* has the same geometry as the candidate path 42*a*, e.g. in FIG. 4. However, due to the load constraint, the load values are less critical at the selected load location 50*a*, as shown by the hatchings of the indications 64*a*-64*d*. The modified trajectory 40*b* is then executed by the manipulator 12.

According to one example, the end effector 26*a* may be redesigned as far as possible before the load constraint is introduced. Thus, a designer may try to redesign the end effector 26*a* as far as possible to reduce load values at the selected load location 50*a*. At a certain point, it may not be possible to redesign the end effector 26*a* further. At this time, the load constraint may be introduced to keep the load values within safe margins in view of structural integrity of the end effector 26*a*. This provides a very efficient design process of the end effector 26*a*.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of handling a manipulator of an industrial robot, the manipulator including a base member, a mounting interface and a kinematic chain between the base member and the mounting interface, the kinematic chain including the base member, the mounting interface and at least one controllable joint, the method comprising:
   providing a candidate trajectory for the manipulator, the candidate trajectory being associated with a candidate path;
   receiving a load location input from a user, the load location input being associated with a load location associated with the industrial robot outside the kinematic chain; and
   calculating load values of a load parameter that will affect the load location if the candidate trajectory is executed.

2. The method according to claim 1, further comprising providing one or more load location parameters associated with the load location, wherein the calculation of the load values is based on the one or more load location parameters.

3. The method according to claim 1, further comprising communicating load value information associated with the load values to the user.

4. The method according to claim 3, further comprising visualizing the candidate path associated with the candidate trajectory, wherein the load value information is displayed in association with the candidate path.

5. The method according to claim 1, further comprising modifying the candidate trajectory based on the load values to provide a modified trajectory.

6. The method according to claim 5, wherein the modification of the candidate trajectory includes a modification of a configuration of the industrial robot, a modification of the candidate path, a modification of a speed of the candidate trajectory and/or a modification of an acceleration of the candidate trajectory.

7. The method according to claim 5, further comprising receiving, from the user, a constraint input defining a load constraint of the load values at the load location; wherein the modification of the candidate trajectory includes modifying the candidate trajectory to provide a modified trajectory where the load values will meet the load constraints if the modified trajectory is executed.

8. The method according to claim 1, wherein the load values are emergency load values that will affect the load location if the candidate trajectory is executed and if an emergency brake of the manipulator is performed during execution of the candidate trajectory.

9. A control system for handling a manipulator of an industrial robot, the manipulator having a base member, a mounting interface and a kinematic chain between the base member and the mounting interface, the kinematic chain including the base member, the mounting interface and at least one controllable joint, the control system comprising at least one data processing device and at least one memory having a computer program stored thereon, the computer program including program code which, when executed by the at least one data processing device, causes the at least one data processing device to perform the steps of:
   providing a candidate trajectory for the manipulator, the candidate trajectory being associated with a candidate path;
   receiving a load location input from a user, the load location input being associated with a load location associated with the industrial robot outside the kinematic chain; and
   calculating load values of a load parameter that will affect the load location if the candidate trajectory is executed.

10. The control system according to claim 9, wherein the computer program comprises program code which, when executed by the at least one data processing device, causes the at least one data processing device to perform the steps of:
    providing one or more load location parameters associated with the load location; and
    calculating the load values based on the one or more load location parameters.

11. The control system according to claim 9, wherein the computer program comprises program code which, when executed by the at least one data processing device, causes the at least one data processing device to perform the step of:
    commanding communication load value information associated with the load values to the user.

12. The control system according to claim 11, wherein the computer program comprises program code which, when executed by the at least one data processing device, causes the at least one data processing device to perform the step of:
    commanding visualization of the candidate path associated with the candidate trajectory, wherein the load value information is displayed in association with the candidate path.

13. The control system according to claim 9, wherein the computer program comprises program code which, when executed by the at least one data processing device, causes the at least one data processing device to perform the step of:
    modifying the candidate trajectory based on the load values to provide a modified trajectory.

14. The control system according to claim 9, wherein the modification of the candidate trajectory includes a modification of the candidate path, a modification of a speed of the candidate trajectory and/or a modification of an acceleration of the candidate trajectory.

15. The control system according to claim 13, wherein the computer program comprises program code which, when executed by the at least one data processing device, causes the at least one data processing device to perform the step of:
    receiving, from the user, a constraint input defining a load constraint of the load values at the load location; wherein the modification of the candidate trajectory includes modifying the candidate trajectory to provide a modified trajectory where the load values will meet the load constraints if the modified trajectory is executed.

16. The control system according to claim 9, wherein the load values are emergency load values that will affect the load location if the candidate trajectory is executed and if an emergency brake of the manipulator is performed during execution of the candidate trajectory.

17. An industrial robot comprising a manipulator and a control system for handling the manipulator, the manipulator having a base member, a mounting interface and a kinematic chain between the base member and the mounting interface, the kinematic chain including the base member, the mounting interface and at least one controllable joint, the control system having at least one data processing device and at least one memory having a computer program stored thereon, the computer program including program code which, when executed by the at least one data processing device, causes the at least one data processing device to perform the steps of:

provid ing a candidate trajectory for the manipulator, the candidate trajectory being associated with a candidate path;

receiving a load location input from a user, the load location input being associated with a load location associated with the industrial robot outside the kinematic chain; and calculating load values of a load parameter that will affect the load location if the candidate trajectory is executed.

18. The method according to claim 2, further comprising communicating load value information associated with the load values to the user.

19. The method according to claim 2, further comprising modifying the candidate trajectory based on the load values to provide a modified trajectory.

20. The method according to claim 2, wherein the load values are emergency load values that will affect the load location if the candidate trajectory is executed and if an emergency brake of the manipulator is performed during execution of the candidate trajectory.

* * * * *